March 18, 1952     C. A. LYSIKOWSKI     2,589,715
TROLLING SINKER
Filed Sept. 12, 1946
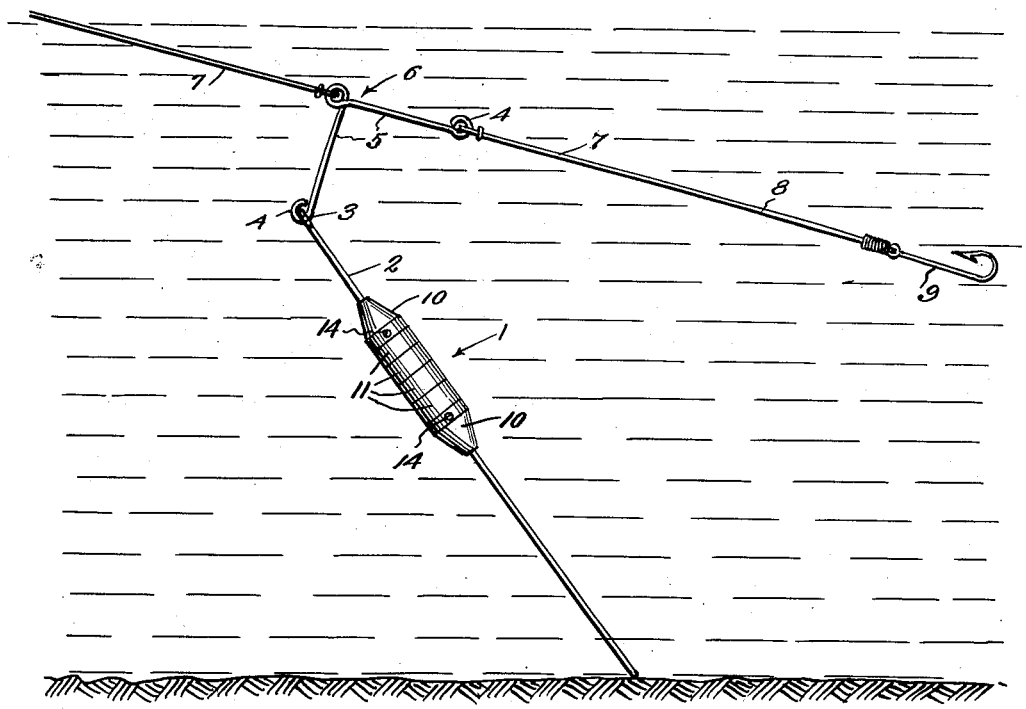
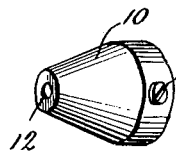
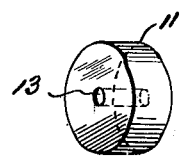
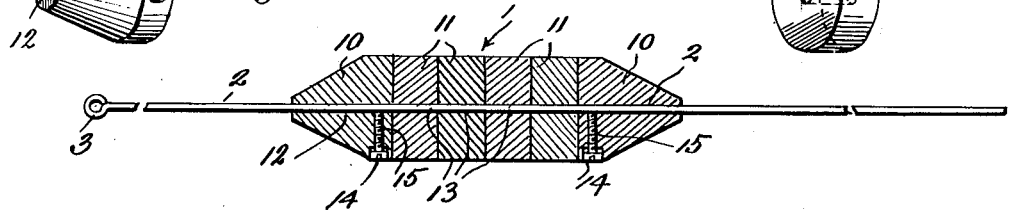
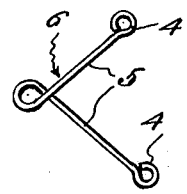
INVENTOR.
CARL A. LYSIKOWSKI

Patented Mar. 18, 1952

2,589,715

UNITED STATES PATENT OFFICE 2,589,715

TROLLING SINKER

Carl A. Lysikowski, Cleveland, Ohio

Application September 12, 1946, Serial No. 696,436

1 Claim. (Cl. 43—43.14)

This invention relates to a sinker for use upon a fishing line and more particularly to a sinker for use when trolling. When a fisherman is trolling for fish which feed near the bottom of a lake or river the line is weighted by a sinker which drags along the bottom and is liable to become caught in rocks, sunken logs, and other snags and the line broken.

It is one object of the invention to provide a sinker of such construction that it may be drawn along the bottom of a lake or river without becoming caught by snags and causing the line to be broken.

Another object of the invention is to provide a sinker so formed that a heavy body carried by a rod will be disposed above the bottom of the lake or river and thus prevented from being caught by rocks or other snags across which the lower end of the rod moves.

Another object of the invention is to provide a sinker wherein the heavy body may be shifted along the rod to adjusted positions and firmly secured against slipping along the rod.

Another object of the invention is to provide a heavy body consisting of disks disposed between end pieces or blocks which are tapered to prevent them from catching against obstructions and releasably secured to the rod so that they may be shifted along the rod and also allow a desired number of disks to be fitted upon the rod between the end blocks and thus provide a sinker of desired weight.

The invention is illustrated in the accompanying drawings wherein:

Fig. 1 is a side elevation showing the improved sinker in use.

Fig. 2 is a view showing the sinker in longitudinal section.

Fig. 3 is a perspective view of an end block forming part of the heavy body of the sinker.

Fig. 4 is a perspective view of an intermediate block or disk.

Fig. 5 is a perspective view of a wire yoke with which the sinker is connected.

This improved sinker is primarily intended for use when trolling but it is not restricted to such use as it may be used for still fishing. It consists briefly of a heavy body 1 mounted upon a rod 2. The rod is of suitable thickness and while it is preferably seventeen inches long it may be of other lengths. The upper end of the rod or wire strand is bent to form an eye 3 which is loosely engaged through one of the eyes 4 formed at ends of the arms 5 of a resilient yoke 6, and referring to Figure 1 it will be seen that when the sinker is in use and engaged with the eye of one arm of the yoke the yoke is interposed in the length of the fishing line 7 which has portions tied through the eye of the yoke and the eye 4 of its other arm. The leader 8 of the hook 9 is tied to the fishing line so that it extends in longitudinal alignment with the fishing line and the arm of the yoke to which the sinker is connected extends downwardly toward the bottom of the lake or river.

The body of the sinker consists of end blocks 10 and a number of intermediate blocks 11, all of which are formed of heavy metal, and while four intermediate blocks have been shown in the drawings it will be understood that any number may be provided and be of various thicknesses so that by using the correct number of intermediate blocks the sinker may be caused to have a predetermined weight. The openings 12 and 13 formed through the blocks 10 and 11 are of such diameter that they snugly receive the rod 2 and the end blocks are provided with screws 14 which pass through threaded openings 15 formed in the inner end portions of the end blocks and have binding engagement with the rod when tightened. The inner end portions of the end blocks in which the openings 15 are formed are of an even diameter corresponding to the diameter of the intermediate blocks, but for the remainder of its length each end block tapers toward its outer end. Therefore if the upper or front end of the sinker should engage thick logs or other obstructions, the sinker will slide over the obstruction. The blocks 10 and 11 preferably have a combined length of five inches and it is preferred to have the body or weight so located upon the rod that it will be one and a half inches from the upper or front end of the rod and that the rod will project eleven inches from the rear or lower end of the weight or body. By so proportioning the rod and the body and so locating the body upon the rod, the sinker will extend at an angle of 45° when in use and as the lower or rear end of the rod rests upon the bottom of the lake or river the weight or body will be supported at such a height that it will readily pass through grass, weeds, or the like. If a rock or log is encountered it will be engaged by the portion of the rod projecting downwardly from the heavy body and this portion of the rod will easily pass over the obstruction without catching against the same. By loosening the screws the body may be slid along the rod to adjusted positions and the screws again tightened, and by loosening the screw of the rear end block this end block may be readily removed from the rod and some of the intermediate blocks removed to reduce the weight of the sinker or permit additional intermediate blocks to be applied to increase the weight of the sinker.

Having thus described the invention, what is claimed is:

A sinker for fishing lines comprising an elongated rod straight throughout its length and formed at its front end with an eye, a weight of greatly less length than the rod fitting snugly about said rod and shiftable along the rod to adjusted positions thereon in which portions of the rod project from the front and rear ends of the weight, the rear end of the rod being adapted to rest upon the bottom of a body of water and supporting the weight spaced upwardly from the said bottom of the body of water a distance sufficient to clear rocks and other obstructions, said weight having portions formed with transversely extending threaded openings, set screws passing through the threaded openings with their inner ends abutting the rod and securing the weight in an adjusted position upon the rod, and means for connecting the rod with a fish line consisting of a strand of wire bent intermediate its length to form a fish line receiving eye and arms diverging therefrom, one arm having its rear end formed with an eye for receiving a fish hook leader, and the other arm extending downwardly from the front end of the first arm and formed at its lower end with an eye loosely engaged through the eye at the front end of said rod.

CARL ALBERT LYSIKOWSKI.

REFERENCES CITED

The following references are of record in the file of this patent:

UNITED STATES PATENTS

| Number | Name | Date |
|---|---|---|
| 77,774 | Smith | May 12, 1868 |
| 501,346 | Homan | July 11, 1893 |
| 725,428 | Evans | Apr. 14, 1903 |
| 1,989,850 | Dorsey | Feb. 5, 1935 |
| 2,121,279 | Beck | June 21, 1938 |
| 2,122,836 | Gegerfeldt | July 5, 1938 |
| 2,157,003 | Mussina | May 2, 1939 |
| 2,494,620 | Johnson | Jan. 17, 1950 |